United States Patent
Zordan

[11] 4,142,026
[45] Feb. 27, 1979

[54] DRY CELL ADAPTER

[76] Inventor: Macario J. Zordan, 12/9th St., Waterford, N.Y. 12188

[21] Appl. No.: 789,778

[22] Filed: Apr. 22, 1977

[51] Int. Cl.² .......................................... H01M 2/10
[52] U.S. Cl. .................................... 429/100; 429/121
[58] Field of Search ................... 429/100, 96, 97, 98, 429/99, 121

[56] References Cited

U.S. PATENT DOCUMENTS

| | | | |
|---|---|---|---|
| 1,592,678 | 7/1926 | Tannert | 429/99 |
| 2,886,623 | 5/1959 | Lehr | 429/98 |
| 3,336,165 | 8/1967 | Brownlee | 429/97 |
| 3,923,549 | 12/1975 | Mabuchi et al. | 429/158 |
| 3,969,148 | 7/1976 | Trattner | 429/100 |
| 3,990,919 | 11/1976 | Krueger | 429/100 |

FOREIGN PATENT DOCUMENTS

| | | | |
|---|---|---|---|
| 2439206 | 8/1975 | Fed. Rep. of Germany | 429/100 |
| 1441645 | 7/1976 | United Kingdom | 429/100 |

*Primary Examiner*—Donald L. Walton

[57] ABSTRACT

An adapter consisting of a tube with one mode using a metallic base that provides a support for the electrical conducting spring whose function is to complete an electrical circuit between base of tube and base of "C" cell battery that will be in contact with spring when adapter is in use.

2 Claims, 3 Drawing Figures

DRY CELL ADAPTER

Reference is hereby made to prior application Ser. No. 765,923 having a filing date of 2-7-77 now abandoned relating to the same invention.

This invention relates to an adapter designed to hold a size "C" cell battery with the object of providing a tool that will permit a size "C" cell battery to be used to operate devices designed to use size "D" cell battery or batteries.

This tool is needed because with so many battery operated devices being manufactured some designed for size "C" batteries and others designed to use size "D" cell batteries one never seems to have the proper size battery on hand. A few adapters and a supply of size "C" cell batteries and either device can be operated.

Figure 1:
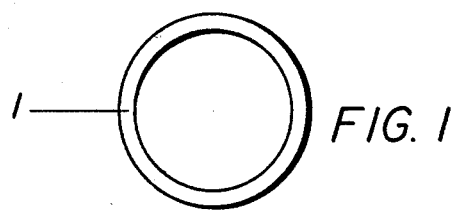
FIG. 1 is a top view of the tube used in the adapter.

FIG. 1 illustrates a tube 1 which is a part of the "C" adapter said tube to have an outside diameter equal to that of a size "D" cell battery and an inside diameter equal to the maximum diameter that is standard for a size "C" cell battery, plus a clearance factor, that will permit a size "C" cell battery to move freely in its longitudinal direction with said tube having a length that will adequately support a size "C" cell battery but not interfere with its operation.

Figure 2:
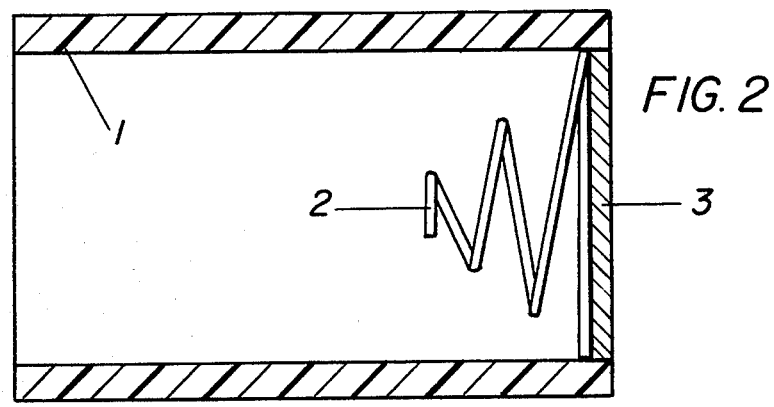
FIG. 2 is an exploded cross sectional view of one mode of adapter assembly.
Figure 3:
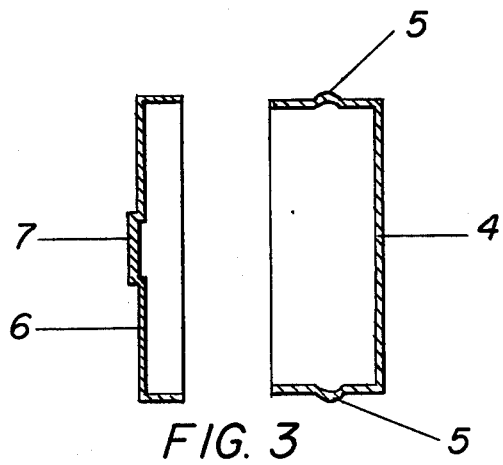
FIG. 3 is an exploded cross sectional view of alternatives that can be used in the make up of the adapter.

To make this invention operative requires that tube 1, shown constructed of a mon-metallic material, be equipped with the means of providing reliable electrical continuity for a distance equal to the difference in length between that of a size "D" cell battery and that of a size "C" cell battery with one mode of accomplishing this shown in the exploded cross sectional view of FIG. 2 whereby the electrical conducting spring 2 is inserted into cavity of tube 1 so as to make reliable electrical contact with a metallic base 3 with base 3 having a diameter greater than the inside diameter of tube 1 so that base 3 will be firmly gripped by tube 1 when base 3 is inserted into cavity of and flush with base of tube 1. Another mode uses a metallic container 4 as shown in FIG. 3 with metallic container 4 having an outside diameter equal to that of a size "C" cell battery and having a protuberance 5 at its girth so that the diameter at protuberance 5 is greater than the inside diameter of tube 1 which will permit tube 1 to grip container 4 at point of protuberance 5 when container 4 is inserted into cavity of tube 1 in such manner that base of container 4 is flush with base of tube 1. The metallic container 4 can now be used to provide the electrical length required in several ways, one by inserting an electrical conducting spring 2 into cavity of container 4 and inserting container 4 into cavity of tube 1, secondly by providing the container 4 with a metallic top 6 as shown in FIG. 3 with top 6 having in its center a protuberance 7 of sufficient area and extend sufficiently so as to provide a reliable electrical connection with terminal and/or battery that protuberance 7 will be in contact with when adapter is in use.

To use the adapter insert a size "C" cell battery base first into cavity of tube and insert adapter in device as instructed for a size "D" cell battery.

I claim the following:

1. A dry cell adapter comprising a non-conductive cylindrical tube open at one end and closed at the other end by a hollow interior metallic closure including two parts each part having a bottom and a surrounding rim, said rims being fitted together forming the hollow closure, the bottom of one part being externally flush with an end of the cylinder, said tube having external dimensions approximately equal to those of a size D cell with its inside diameter permitting snug insertion of a size C cell, the bottom of the other closure part having a protuberance in its center of sufficient area and height, interior of said tube, permitting reliable electrical connection of said closure to permit electrical continuity for a distance equal to the difference in length between that of a size D cell and that of a size C cell.

2. In combination, a size C cell battery and dry cell adapter as claimed in claim 1.

* * * * *